UNITED STATES PATENT OFFICE.

MARMADUKE M. M. SLATTERY, OF FORT WAYNE, INDIANA, ASSIGNOR TO THE FORT WAYNE ELECTRIC LIGHT COMPANY, OF SAME PLACE.

ELECTRODE FOR SECONDARY BATTERIES.

SPECIFICATION forming part of Letters Patent No. 446,104, dated February 10, 1891.

Application filed April 6, 1889. Serial No. 306,247. (No model.)

*To all whom it may concern:*

Be it known that I, MARMADUKE M. M. SLATTERY, a citizen of the United States, residing at Fort Wayne, in the county of Allen and State of Indiana, have invented certain new and useful Improvements in Electrodes for Secondary Batteries; and I do hereby declare that the following is a full, clear, and exact description of the invention, which will enable others skilled in the art to which it appertains to make and use the same, reference being had to the accompanying drawing, which forms part of this specification.

The object of my invention is to provide an improved form of electrode for secondary batteries; and it consists in the following method of construction, resulting in a new article of manufacture.

My improved electrode or plate consists of copper, and is used in connection with an alkaline solution and a suitable other electrode, which may be of zinc or iron, preferably iron, or other material adapted to such purpose. I make no claim here, however, to the composition of such other electrode. In making this copper electrode I take very finely-divided copper in a pure form, such as is obtained by electrical reduction from the oxide and which is in an almost impalpable powder. This I place in a suitable mold or die and compress the same by hydraulic pressure or otherwise until the copper powder is squeezed into a coherent mass or plate of a density and strength sufficient to allow of its manipulation, handling, and use as a battery-plate, but having a formation more porous than that of ordinary solid copper plate or sheet.

The principal advantages of such a plate or electrode are its inoxidizable character, its lightness, it capacity for absorption of gas and liquid, and its permanence.

The form of the electrode is immaterial.

I claim—

1. An electrode for secondary batteries formed of finely-divided pure copper compressed into a coherent mass.

2. In combination with one electrode and an alkaline solution in a secondary cell, a second electrode formed of compressed finely-divided electrically-reduced pure copper.

3. An electrode for secondary batteries composed of pure copper powder compressed into desired form.

4. In a secondary battery, a porous copper electrode consisting of fine copper powder strongly compressed into a coherent body, an alkaline solution, and another electrode of zinc, iron, or other metal.

In testimony whereof I do hereto subscribe my name in the presence of two witnesses, this 3d day of April, 1889.

MARMADUKE M. M. SLATTERY.

Witnesses:
J. E. TALBOT,
CHARLES C. MILLER.